Dec. 21, 1954 R. E. BAKER 2,697,747
BLANKING INSERTION FOR RADAR AND TELEVISION
Filed Nov. 30, 1949
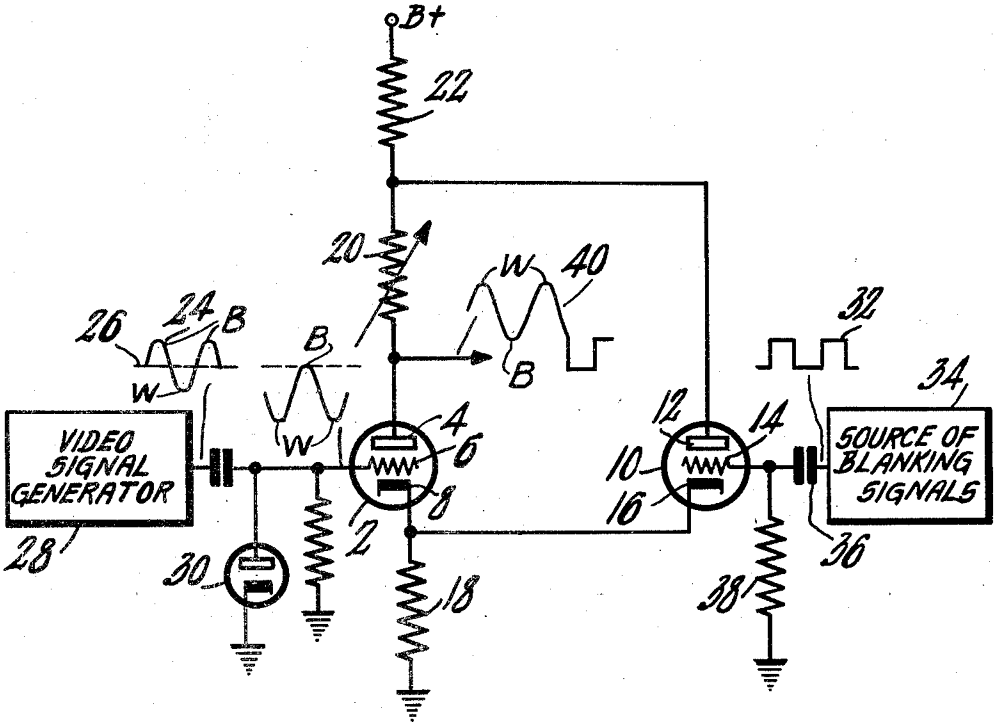
INVENTOR
Richard E. Baker
BY
Olin V. Mitchell
ATTORNEY

United States Patent Office 2,697,747

Patented Dec. 21, 1954

2,697,747

BLANKING INSERTION FOR RADAR AND TELEVISION

Richard E. Baker, Woodbury Heights, N. J., assignor to Radio Corporation of America, a corporation of Delaware Application November 30, 1949, Serial No. 130,272

5 Claims. (Cl. 178—7.1)

This invention relates to a circuit apparatus for combining two signals in such manner that the presence of one prevents the other from reaching the output channel.

In most television systems the images are transmitted by scanning the object to be televised at repeated intervals. For example, the object may be scanned in a series of horizontal lines, and in order to prevent video information from being reproduced at the receiver when the scanning beam is returning from the end of one line to the start of another, the video information must be blanked out. This operation is generally performed at the television transmitter by apparatus which combines a blanking signal with the video signals.

In radar applications a pulse is transmitted at uniformly spaced intervals and the returning "echo" signals may be displayed by applying them in such manner as to control the intensity of a beam as it scans the face of a kinescope for repeated intervals of time. At the end of any of these intervals the scanning beam returns to the start of the next interval and the beam must be blanked out.

In television applications the blanking of the video signal is usually accomplished by mixing a large amplitude blanking with the video signal and clipping the result. However, this requires several tubes to set the relative amplitudes to the proper level and to perform the clipping action necessary.

According to this invention, the blanking insertion is accomplished by apparatus that requires only three tubes that can be adjusted so as to set the blanking pedestal to the required height. One of the additional advantages that is derived by employing this invention is that regardless of the amplitude of the video signal during the blanking period, it cannot appear on the output circuit.

Therefore, one of the objects of this invention is to provide a simplified, improved circuit arrangement whereby video signals and blanking signals may be combined in such manner as to preclude the presence of even strong video signals during the blanking interval in the output signal.

This and other objects will become apparent from the detailed discussion of the drawing in which:

Amplifier 2 having a plate 4, control grid 6 and a cathode 8, and amplifier 10 having a plate 12, control grid 14 and a cathode 16 are connected in the following manner: The cathodes 8 and 16 are tied to a source of fixed potential which may be ground via a common cathode biasing resistor. The plate 4 of the amplifier 2 is connected to a source of B+ potential via at least two impedances which may be the resistors 20 and 22 connected in series. The plate 12 of amplifier 10 is connected to the same source of B+ via at least one of the impedances on the plate circuit of the amplifier 2 and in the illustrative example by the resistor 22.

The video signals which may be of the form illustrated by waveform 24 that adjust themselves about the A. C. axis 26 are supplied by video signal generator 28, which may be any ordinary type television pick up tube well known to those skilled in the art. D. C. insertion or clamping of these signals to a source of fixed potential, which may be ground potential, is accomplished by the diode 30 that is connected in such polarity that the video signals presented to the grid 6 vary in a negative direction with respect to the ground potential.

A series of blanking signals, which may be square waves of the duration equal to the blanking interval as indicated by the waveform 32, are supplied by a source of blanking signals 34, which may be of any standard construction, to the grid 14 of the amplifier 10 via the coupling condenser 36 and via the grid leak resistor 38.

The output may vary in a manner such as illustrated by waveform 40 and is derived at the plate 4 of the amplifier 2.

The negative portion of waveform 32 is sufficient to cut off amplifier 10. However, when the positive square wave of the waveform 32 is applied to the grid 14, the amplifier 10 is driven to substantially plate saturation and the amplifier 2 is cut off. Inasmuch as the video signals applied to the grid 6 of the amplifier 2 have a negative polarity, they cannot effect the level of voltage available at plate 4 during the blanking interval and therefore the blanking pulse is a "clean" signal.

If no video signal is present at the grid 6 of the amplifier 2, the voltage at plate 4 will be at a certain value determined by the value of the B+ voltage, the impedances 22 and 20 and the characteristics of the amplifier 2. Assume that the polarity of the video signals applied to the grid 6 of the amplifier 2 is such that the black level is set at ground potential by the clamping tube 30. Ground potential on the grid of this tube is not sufficient to cut it off and therefore the black level potential at the plate 4 is below B+ by an amount determined by the sum of the resistors 20 and 22. When a blanking pulse is applied to the grid 14 of the amplifier 10, it cuts off the amplifier 2. The voltage at the plate 4 then is below B+ by an amount determined by the current flowing through the amplifier 10 and the value of the resistor 22. Therefore, by adjusting the value of the resistor 22, the voltage at the plate 4 may be made greater than or less than the value attained when the video signal applied to the grid 6 of the amplifier 2 is at the black level.

Having thus described my invention, I claim:

1. A circuit arrangement for blanking insertion comprising a first electron discharge device having at least a plate, a control grid, and a cathode, a second electron discharge device having at least a plate, a control grid and a cathode, a first source of fixed potential, an impedance connected between said cathodes and said first source, means including said last named impedance for establishing a normal voltage on said control grid of said first electron discharge device, a second source of fixed potential, at least two additional impedances connected in series between the plate of said first electron discharge device and said second source, the plate of said second electron discharge device being connected to a point intermediate said two impedances, a source of blanking pulses, said latter source being connected to the grid of said second electron discharge device, a source of video signals, said source of video signals being coupled to the grid of said first electron discharge device, means coupled to said source of video signals for establishing said video signals negative with respect to said normal voltage on said control grid of said first electron discharge device, and an output lead connected to the plate of said first electron discharge device.

2. An apparatus for combining video and blanking signals in such manner that a clear blanking signal is produced comprising a source of video signals, an electron discharge device including an input circuit, means for establishing a normal voltage in said input circuit, means for establishing the black level of said video signals at a fixed value so that the excursions of said video signals are of a given polarity with respect to said normal voltage, means for applying said video signals to said discharge device in such manner that they tend to reduce the conduction therein, a source of blanking pulses, and means adapted to cut off the electron flow in said electron device during said blanking pulses.

3. A circuit arrangement for combining video signals representing the variations in light intensity of a scanned object with blanking signals in such manner that interference between the two is avoided, said circuit arrangement comprising a first electron discharge device having at least a plate, a cathode and a grid, said cathode being connected to a first source of fixed potential via an impedance, said plate being connected to a second source of fixed potential via at least two impedance elements, a second electron discharge device having at least a plate, a cathode and a grid, said cathode being connected to the cathode of said first electron discharge device and said plate being connected to said second fixed potential via at least one of said impedance elements, means for applying negative video signals to the grid of said first electron discharge device, said last-named applying means including a unilateral current conducting device having its positive terminal connected to said grid of said first electron discharge device and its negative terminal connected to said first source of fixed potential.

4. Apparatus for combining blanking signals and video signals in such manner that the video signals cannot interfere with the blanking signals comprising in combination a source of video signals, a first amplifier having a plate, cathode and grid, means for coupling said video signals to said amplifier in such manner that an increase in the amplitude of the video signals tends to reduce the conductivity of said first amplifier, a source of blanking signals, a second amplifier having a plate, cathode and grid, means for coupling said blanking signal to said second amplifier in such manner that its conductivity is increased during the blanking signal, a first source of fixed potential, a common cathode load impedance connected between said source and said cathodes, said cathode load impedance having a value such that when traversed by current in said second amplifier during said period of increased conductivity said first amplifier is cut off in response to said blanking signals, a second source of fixed potential, and a common load impedance connected between said second source and said plates.

5. Apparatus for combining video and blanking signals in such manner that a clear blanking signal is produced comprising an output circuit, means for conducting video signals to said output circuit, said conducting means including an electron discharge device having an anode and a cathode, means for interrupting the flow of video signals in said conducting means in response to a change in the voltage across said cathode and said anode, and means for clamping said video signals to a given potential such that an increase in the amplitude of said video signals reduces the conductivity of said first mentioned conducting means.

References Cited in the file of this patent

UNITED STATES PATENTS

| Number | Name | Date |
|---|---|---|
| 2,158,261 | Urtel | May 16, 1939 |
| 2,233,317 | Konkle | Feb. 25, 1941 |
| 2,347,248 | Bingley | Apr. 25, 1944 |
| 2,452,213 | Sontheimer | Oct. 26, 1948 |
| 2,482,561 | Shenk | Sept. 20, 1949 |
| 2,568,541 | Duke | Sept. 18, 1951 |